(12) United States Patent
Martini et al.

(10) Patent No.: US 7,735,329 B2
(45) Date of Patent: Jun. 15, 2010

(54) DEVICE AND METHOD FOR CONTROLLING THE AIR-CONDITIONING SYSTEM OF A VEHICLE

(75) Inventors: Stefania Martini, Orbassano (IT);
Maria Laura Parodi, Orbassano (IT);
Carloandrea Malvicino, Orbassano (IT)

(73) Assignee: C.R.F. Societa Consortile per Azioni, Strada Torino (IT)

( * ) Notice: Subject to any disclaimer, the term of this patent is extended or adjusted under 35 U.S.C. 154(b) by 634 days.

(21) Appl. No.: 11/559,429

(22) Filed: Nov. 14, 2006

(65) Prior Publication Data

US 2007/0151271 A1 Jul. 5, 2007

(30) Foreign Application Priority Data

Nov. 16, 2005 (EP) .................................. 05425806

(51) Int. Cl.
*F25B 1/00* (2006.01)
*F25B 41/04* (2006.01)
*F25B 41/00* (2006.01)
*F25B 27/00* (2006.01)

(52) U.S. Cl. .......................... 62/228.1; 62/204; 62/209; 62/210; 62/214; 62/215; 62/223; 62/236

(58) Field of Classification Search ................ 62/228.1, 62/236, 223, 209, 214, 215, 204, 210
See application file for complete search history.

(56) References Cited

U.S. PATENT DOCUMENTS 4,893,480 A * 1/1990 Matsui et al. .................. 62/225

5,564,625 A 10/1996 Straub
2004/0123612 A1 * 7/2004 Pham et al. ................. 62/228.3

FOREIGN PATENT DOCUMENTS

EP 1205716 5/2002
FR 2810276 12/2001

OTHER PUBLICATIONS

European Search Report dated Apr. 3, 2006, for Application No. 05425806.6.

* cited by examiner

*Primary Examiner*—Frantz F. Jules
*Assistant Examiner*—Travis Ruby
(74) *Attorney, Agent, or Firm*—Sheridan Ross PC

(57) ABSTRACT

A control device for an air-conditioning system of a vehicle comprises an evaporator, a compressor with externally controlled variable displacement, and an expansion valve. The control device comprises a control block that receives a reference temperature indicating a desired temperature of the air downstream of the evaporator, and an effective temperature of the air present downstream of the evaporator. The control device-supplies a control signal for the compressor to bring the effective temperature substantially equal to the reference temperature. An observer module receives the control signal and supplies a temperature disturbance indicating an estimate of the oscillatory effect generated by an expansion valve on the temperature of air downstream of the evaporator when a compressor is driven by the control signal. An adder block removes from the effective temperature the temperature disturbance so as to eliminate the oscillatory effect on the effective temperature downstream of the evaporator.

11 Claims, 3 Drawing Sheets

DEVICE AND METHOD FOR CONTROLLING THE AIR-CONDITIONING SYSTEM OF A VEHICLE

CROSS REFERENCE TO RELATED APPLICATION

This application is a claims the benefit of European Application Serial No. 05425806.6, filed Nov. 16, 2005, the entire disclosure of which is hereby incorporated herein by reference.

BACKGROUND OF THE INVENTION

The present invention relates to a device and to a method for the control of the air-conditioning system of a vehicle, in particular a motor vehicle such as an automobile, a bus, etc.

As is known, the air-conditioning systems of motor vehicles are typically provided with a closed-loop cooling circuit equipped with an evaporator and a control system capable of regulating the temperature of the air introduced into the passenger compartment.

FIG. 1 shows a control system 1 of a cooling circuit 2, which is traversed by the coolant and comprises in succession: an evaporator 3; a compressor 4, which is designed to take in, at a certain intake pressure, the coolant in the vapour phase from the evaporator 3 so as to obtain a control of the temperature of the air downstream of the evaporator 3 itself; a condenser 5, designed to receive the coolant in the vapour phase from the compressor 4; and an expansion valve 6 designed to receive the coolant in the liquid phase from the condenser 5 to supply it in dual-phase (i.e., vapour phase and liquid phase) to the evaporator 4 itself.

In particular, the compressor 4 is constituted by a compressor with externally controlled variable displacement, on which it is possible to operate by causing the displacement (defined as the working volume, where the coolant is compressed) to vary as the thermal load acting on the air-conditioning system varies.

The possibility of varying the displacement of the compressor is obtained via the electromagnetic regulation valves (not illustrated), which are driven via an external control signal $S_C$ and are designed to control the device that enables modulation of the displacement of the compressor 4.

The control system 1 moreover comprises a control device 7, which is able to generate the control signal $S_C$ of the compressor 4 in such a way as to control the temperature of the air downstream of the evaporator 3 as a function of the deviation between a reference temperature $T_{REF}$ set by the user by means of an externally controlled selector device 9 and an effective temperature $T_{MIS}$ indicating the temperature of the air present downstream of the evaporator 3. The effective temperature $T_{MIS}$ can be measured using a temperature sensor 10, set downstream of the evaporator 3.

The control device 7 comprises an adder block 11 having a first input designed to receive the reference temperature $T_{REF}$ from the selector device 9, a second input designed to receive the effective temperature $T_{MIS}$ from the temperature sensor 10, and an output supplying a temperature error $e_r$, given by the difference between the reference temperature $T_{REF}$ and the effective temperature $T_{MIS}$.

The control device 7 moreover comprises a control block 12, which is designed to receive at input the temperature error $e_r$ and a set of measurement parameters, such as for example Te (external temperature), RPM (engine r.p.m.), and RH (relative humidity) correlated to the exogenous disturbance, and supplies at output, according to the latter, the control signal $S_C$.

In detail, the control block 12 comprises a compensating network of a proportional-integral (PI) type (not illustrated) and generates a control signal $S_C$ corresponding to a pulse-width modulation (PWM) signal, which drives the electromagnetic valves for regulating the stroke of the pistons, thus determining control of the displacement of the compressor 4. In the case in point, the regulation of the displacement determines a control of the intake pressure of the compressor 4 and, consequently, an indirect control of the temperature of the air downstream of the evaporator 3.

It is moreover known that, in the air-conditioning systems described above, the expansion valve 6 for supplying the coolant to the evaporator 3 is an internally controlled device, operation of which is completely independent of the control implemented on the compressor 4 by the control device 7.

The complete independence existing between the two controls determines, in certain limit conditions of operation of the compressor 4, a discordance in the control of some parameters that characterize operation of the cooling circuit 2, such as for example the intake pressure of the compressor 4 and the temperature of the air downstream of the evaporator 3, in this way causing a condition of instability of the air-conditioning system. In the case in point, during its operation, the expansion valve 6 generates a temperature disturbance $\Delta T_{EVAP}$ of an oscillatory type, which alters the temperature of the air downstream of the evaporator 3, and leads, in certain conditions, to instability of the control.

In fact, said temperature disturbance $\Delta T_{EVAP}$ determines an increase of the intake pressure of the compressor 4, which in certain limit conditions exceeds a threshold delimiting the condition of stability of the air-conditioning system, consequently causing a series of oscillations of the flow rate of the coolant, and of the temperature of the air downstream of the evaporator 3. The generation of said oscillations, generally referred to with the term "hunting phenomenon", represents a major drawback in the air-conditioning systems described above in so far as it has a negative effect both on the capacity of minimizing the consumption of the air-conditioning system, and on the thermal comfort of the passenger compartment of the vehicle.

BRIEF SUMMARY OF THE INVENTION

The aim of the present invention is consequently to provide a device and method for control of the air-conditioning system of a vehicle that is able to overcome the drawbacks described above.

The above purpose is achieved by the present invention in so far as it relates to a control device of the air-conditioning system of a vehicle, according to what is specified in the claims.

According to the present invention there is moreover provided a method for control of the air-conditioning system of a vehicle, according to what is specified in the claims.

BRIEF DESCRIPTION OF THE DRAWINGS

The present invention will now be now described with reference to the annexed plate of drawings, which illustrate a non-limiting example of embodiment thereof and in which.

DETAILED DESCRIPTION OF THE INVENTION

The present invention is substantially based upon the principle of supplying a reference temperature $T_{REF}$ indicating the temperature of the air that it is desired to reach downstream of the evaporator; supplying an effective temperature $T_{MIS}$ that indicates the temperature of the air present downstream of the evaporator; generating a control signal $S_C$ that drives the compressor in such a way as to bring the effective temperature $T_{MIS}$ to be substantially equal to the reference temperature $T_{REF}$; generating, according to the control signal $S_C$, a temperature disturbance $\Delta T_{EVAP}$ indicating an estimate of the oscillatory effect that is generated by the expansion valve on the temperature of the air downstream of the evaporator when the compressor is driven by the control signal $S_C$; and finally depurating from the effective temperature $T_{MIS}$ the temperature disturbance $\Delta T_{EVAP}$ estimated in such a way as to eliminate the oscillatory effect on the effective temperature $T_{MIS}$ of the air downstream of the evaporator 3.

Figure 1:
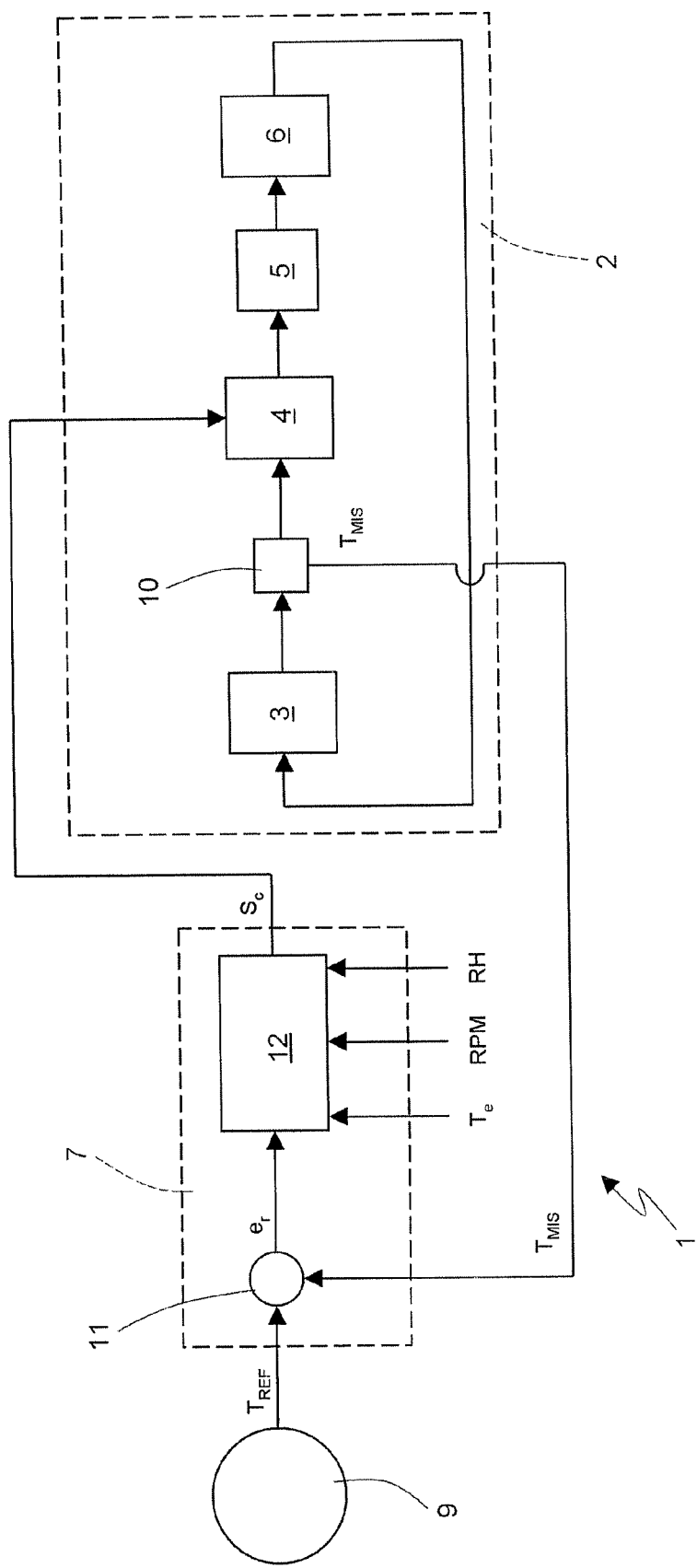
FIG. 1 is a schematic illustration of a control system of an air-conditioning system comprising a control device according to the known art.
Figure 2:
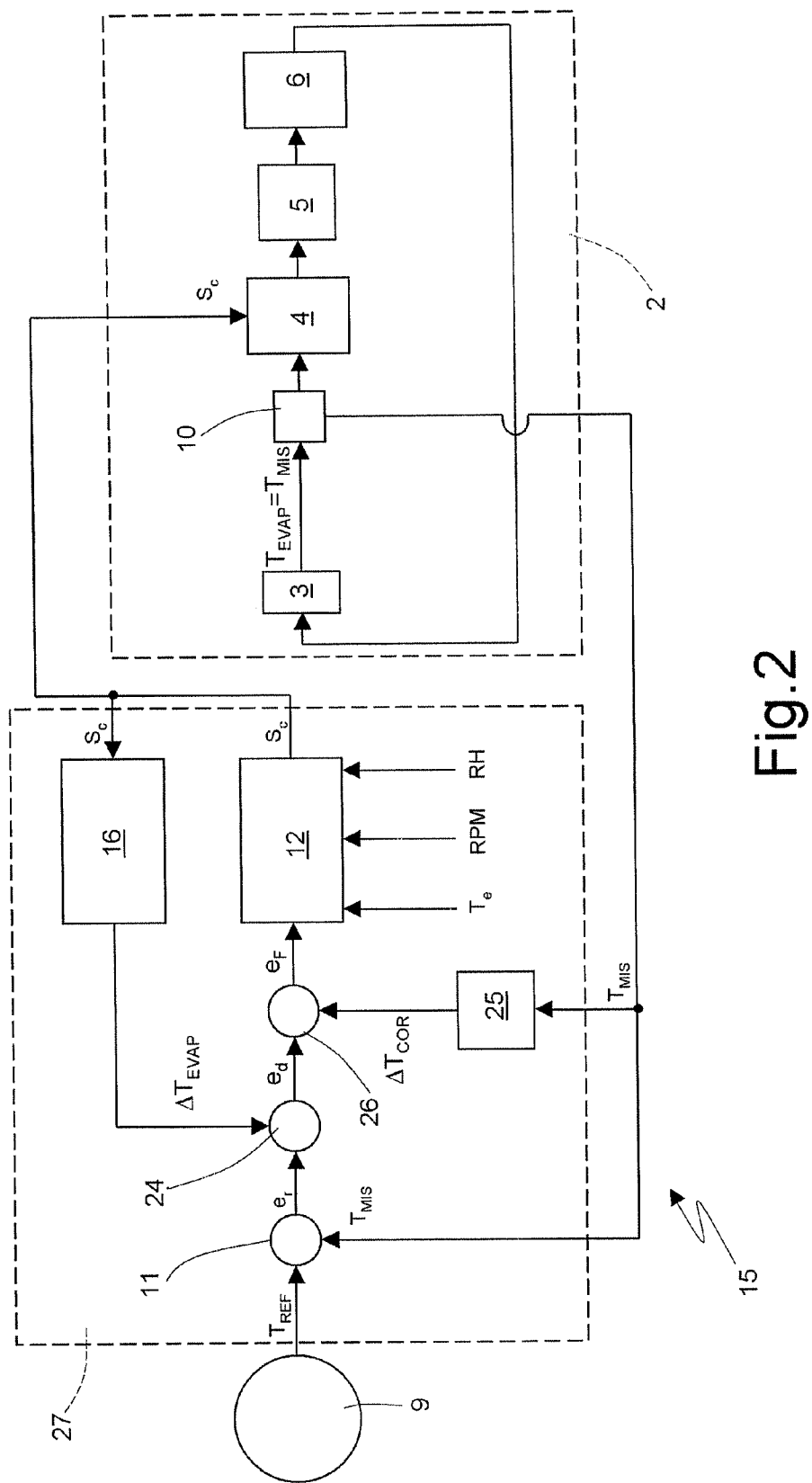
FIG. 2 is a schematic illustration of a control system of an air-conditioning system comprising a control device according to the teachings of the present invention.

FIG. 2 is a schematic illustration of a control system 15 of the temperature of the air downstream of an evaporator, which is partially similar to the system 1, and component parts of which will be distinguished, wherever possible, with the same reference numbers that distinguish corresponding parts of the control system 1.

The control system 15 differs from the control system 1 in so far as it comprises an observer module 16 having the function of estimating the temperature disturbance $\Delta T_{EVAP}$ produced by the expansion valve 6 on the temperature $T_{EVAP}=T_{MIS}$ of the air downstream of the evaporator 3. In the case in point, the observer module 16 comprises an input designed to receive the control signal $S_C$ of the compressor 4, and an output designed to supply the estimate of the temperature disturbance $\Delta T_{EVAP}$.

Figure 3:
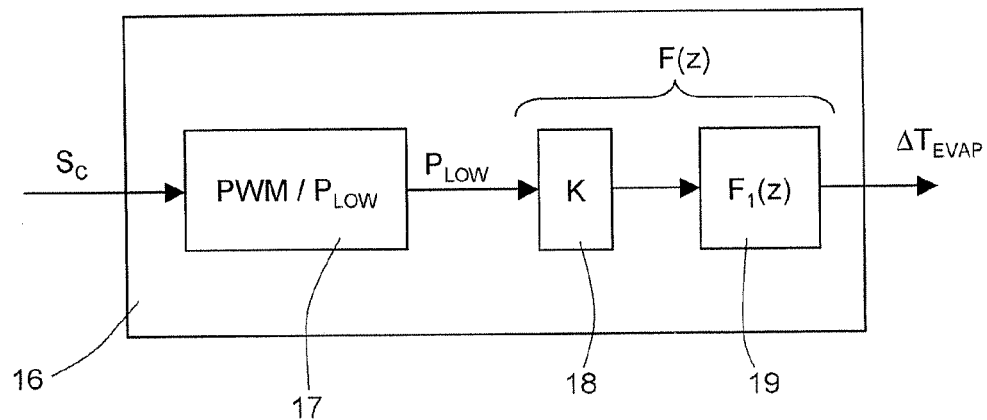
FIG. 3 shows a block diagram of an observer module comprised in the control device illustrated in FIG. 2.

In greater detail, with reference to FIG. 3, the observer module 16 basically comprises a conversion block 17, a gain block 18, and a transformation block 19.

The conversion block 17 receives at input the control signal $S_C$ and supplies at output the intake pressure $P_{LOW}$ of the compressor 4, which is obtained by regulating the displacement thereof via the control signal $S_C$. In particular, in the case where the control block 12 generates the control signal $S_C$ corresponding to a PWM signal, the conversion block 17 implements a biunique function between the PWM pulses of the control signal $S_C$ sent to the compressor 4 and the intake pressure $P_{LOW}$ controlled via the control signal $S_C$ itself.

As regards, instead, the gain block 18 and the transformation block 19, these implement a transfer function $F(z)$ that links the temperature disturbance $\Delta T_{EVAP}$ to the intake pressure $P_{LOW}$ of the compressor 4.

Figure 4:
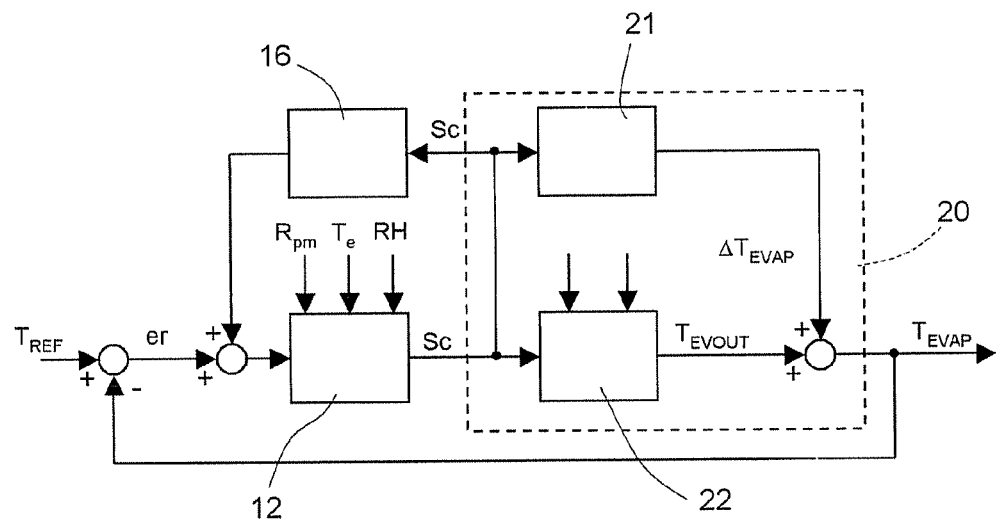
FIG. 4 shows a system model representing the effects produced by the expansion valve and by the evaporator on the temperature of the evaporator as a function of a control signal generated by the control device.

In the case in point, the transfer function $F(z)$ can be determined on the basis of a behavioural model 20 (illustrated by a dashed line in FIG. 4), which represents the overall effect produced by the evaporator 3 and by the expansion valve 6 on the temperature $T_{EVAP}$ of the coolant at output from the evaporator 3 itself, during control of the system 15.

The behavioural model 20 basically comprises a block 21, which models the effect of the expansion valve 6 on the temperature $T_{EVAP}$ of the air downstream of the evaporator 3 as a function of the control signal $S_C$ supplied to the compressor 4, and a block 22, which models the effect of the evaporator 3 on the temperature $T_{EVAP}$ of the air downstream of the evaporator 3 itself as a function of the control signal $S_C$ supplied at input to the compressor 4.

The behavioural model 20 identifies then the overall behaviour of the expansion valve 6 and of the evaporator 3; said behavioural model 20 can be represented by the following system of equations:

$$x(t+1)=Ax(t)+Bu(t)+Re(t)$$

$$Y(t)=Cx(t)+Du(t)+e(t)$$

Where x(t) are the states of the system, u(t) is an input signal corresponding to the intake pressure $P_{LOW}$ of the compressor 4, y(t) is the output signal corresponding to the effective temperature $T_{EVAP}=T_{MIS}$ ($T_{EVAP}=T_{EVOUT}+\Delta T_{EVAP}$) of the air supplied at output from the behavioural model 20, and e(t) is the disturbance $\Delta T_{EVAP}$ introduced by the expansion valve 6 on the temperature of the air $T_{EVOUT}$.

Since the disturbance $\Delta T_{EVAP}$ acts directly on the output of the behavioural model 20, it is possible to assume the matrix R=0 and consequently the system of equations described above can be simplified in the following way:

$$x(t+1)=Ax(t)+Bu(t)$$

$$Y(t)=Cx(t)+Du(t)+e(t)$$

The aforesaid mathematical system can be solved according to the disturbance $e(t)=\Delta T_{EVAP}$ and on the basis of a set of pre-set known conditions. From said system it is then possible to determine the transfer function $F(z)$ that indicates the ratio between the disturbance $e(t)=\Delta T_{EVAP}$ and the intake pressure $P_{LOW}$; said transfer function $F(z)$ is implemented as a whole by the blocks 18 and 19 of the observer module 16:

$$F(z) = \frac{\Delta T_{EVAP}}{P_{LOW}} = KF_1(z) = K\frac{az}{z^2 - bz + c}$$

where K is the gain that is introduced by the gain block 18, whilst the discrete transfer function $$F_1(z) = \frac{az}{z^2 - bz + c}$$

is implemented by the transformation block 19.

With reference to FIG. 2, the observer module 16 and the control block 12 can be implemented in a control device 27, which comprises, in addition to the adder block 11 (comprised in the control system 1 described above), which supplies at output the temperature error $e_r$, an adder block 24, which has an input receiving the temperature error $e_r$, an input receiving the disturbance $\Delta T_{EVAP}$ estimated by the observer module 16, and an output supplying a depurated error $e_d$ given by the difference between the temperature error $e_r$ and the estimated disturbance $\Delta T_{EVAP}$.

The control device 27 moreover comprises a correction block 25, which has an input receiving the effective temperature $T_{MIS}$, and an output supplying a correction coefficient $\Delta T_{COR}$, which indicates the correction of temperature to be made to the reference signal supplied at input to the control block 12 in such a way as to compensate the deviations present between the reference temperature $T_{REF}$ and the effective temperature $T_{MIS}$ as the temperature of the evaporator 3 varies.

In fact, even though the observer block 16 is able to compensate the oscillations, i.e., the "hunting phenomenon", due to the introduction of the temperature disturbance $\Delta T_{EVAP}$ by the expansion valve 6, the control of the temperature $T_{EVAP}$ is influenced also by the variations of the temperature of the evaporator 3 itself.

In fact, as the reference temperature $T_{REF}$ varies, a deviation occurs between the latter and the effective temperature $T_{MIS}$, which varies as the temperature of the evaporator 3 varies, thus determining a further error on the control thereof. For this purpose, the correction block 25 contains a table, determined in the experimental stage, containing a plurality of correction coefficients $\Delta T_{COR}$, each of which is associated to an effective temperature $T_{MIS}$.

The control device 27 moreover comprises an adder block 26, which has an input receiving the depurated error $e_d$ and an input receiving the correction coefficient $\Delta T_{COR}$, and supplies at output an error $e_F$ given by the difference between the depurated error $e_d$ and the correction coefficient $\Delta T_{COR}$.

During operation, the user sets up the reference temperature $T_{REF}$ of the air that it is desired to obtain downstream of the evaporator 3, which is supplied at input to the adder block 11 that calculates the error $e_r$, and at the same time the observer module 16 estimates on the basis of the control signal $S_C$ the disturbance $\Delta T_{EVAP}$ to be subtracted from the error $e_r$ to guarantee the absence of oscillations on the temperature $T_{EVAP}$ of the evaporator 3.

In this step, the adder block 24 depurates the disturbance $\Delta T_{EVAP}$ from the error $e_r$ in such a way as to generate the depurated error $e_d$ so as to compensate the possible oscillations introduced into the effective temperature $T_{MIS}$. At this point the correction block 25 generates, on the basis of the effective temperature $T_{MIS}$, the correction coefficient $\Delta T_{COR}$ to be subtracted from the depurated error $e_d$. The control block 12 receives the depurated error $e_d$ and generates the control signal $S_C$ that drives the electromagnetic valves for controlling the intake pressure of the air of the compressor 4 so as to bring the measured temperature $T_{MIS}=T_{EVAP}$ to a value substantially equal to the reference temperature $T_{REF}$.

The control device 7 described above is extremely advantageous in so far as it prevents the onset of the hunting phenomenon. The strategy of compensation of the disturbance due to the onset of the hunting phenomenon is always operative, and in the case where the phenomenon is not present, its contribution is zero. Moreover, the control device 7 never changes its structure.

Finally, it is clear that modifications and variations can be made to the control device 27 of the control system 15 described and illustrated herein, without thereby departing from the scope of the present invention, as defined by the annexed claims.

The invention claimed is:

1. A control device for the air-conditioning system of a motor vehicle, the air-conditioning system comprising: an evaporator, a compressor with an externally controlled variable displacement located downstream of said evaporator, and an expansion valve located upstream of said evaporator; wherein said control device comprises:
   (i) a control means for receiving a reference temperature ($T_{REF}$) indicating a temperature of air that is desired to reach downstream of the evaporator, and an effective temperature ($T_{MIS}$) indicating a temperature of the air present downstream of said evaporator, said control means providing a control signal ($S_C$) to said compressor cause said effective temperature ($T_{MIS}$) to be substantially equal to said reference temperature ($T_{REF}$);
   (ii) observer means for receiving the control signal ($S_C$), and to supply a temperature disturbance ($\Delta T_{EVAP}$) indicating an estimate of an oscillatory effect generated by the expansion valve on the temperature of the air downstream of the evaporator when the compressor is driven by the control signal ($S_C$); and
   (iii) first adder means for removing from said effective temperature ($T_{MIS}$) said temperature disturbance ($\Delta T_{EVAP}$) to therefore eliminate the oscillatory effect on said effective temperature ($T_{MIS}$) of the air downstream of the evaporator.

2. A control device according to claim 1, wherein: said observer means estimates said temperature disturbance ($\Delta T_{EVAP}$) on the basis of a system model, and according to said control signal ($S_C$).

3. A control device according to claim 2, wherein: said observer means comprise conversion means to supply an intake pressure ($P_{LOW}$) of the compressor, and transformation means, that receives the intake pressure ($P_{LOW}$) and supplies said temperature disturbance ($\Delta T_{EVAP}$).

4. A control device according to claim 3, wherein: said system model implements a transfer function (F(z)) determined on the basis of a first effect produced by the expansion valve on a temperature ($T_{EVAP}$) of the evaporator, when the compressor is controlled by the control signal ($S_C$) and on the basis of a second effect produced by the evaporator on the temperature ($T_{EVAP}$) of the evaporator itself, when the compressor is controlled by the control signal ($S_C$).

5. A control device according to claim 1, further comprising: second adder means to receive said reference temperature ($T_{REF}$) and said effective temperature ($T_{MIS}$), and to supply a first error ($e_r$) of temperature of the air downstream of the evaporator, which is correlated to the difference between the reference temperature ($T_{REF}$) and the effective temperature ($T_{MIS}$); the first adder means receiving the first temperature error ($e_r$) and the temperature disturbance ($\Delta T_{EVAP}$) for supplying a second temperature error ($e_d$) of the evaporator, which is correlated to the difference between the first temperature error ($e_r$) and the temperature disturbance ($\Delta T_{EVAP}$); said controller means generating said control signal ($S_C$) according to said second temperature error ($e_d$).

6. A control device according to claim 1, further comprising: correction means for receiving said effective temperature ($T_{MIS}$) and supplying a correction coefficient ($\Delta T_{COR}$) indicating the correction to be made on the effective temperature ($T_{MIS}$) to compensate deviations that arise between the reference temperature ($T_{REF}$) and the effective temperature ($T_{MIS}$), as the temperature downstream of the evaporator varies; and third adder means, for receiving the second temperature error ($e_d$) and the correction coefficient ($\Delta T_{COR}$) and supplying third temperature error ($e_F$) of the evaporator correlated to a difference between the second temperature error ($e_d$) and the correction coefficient ($\Delta T_{COR}$); said controller means generating said control signal ($S_C$) as a function of said third error signal ($e_F$).

7. A control device according to claim 1, wherein: said control signal ($S_C$) is a PWM signal to regulate displacement of the compressor.

8. A control method for an air-conditioning system of a motor vehicle; the air-conditioning system comprising: an evaporator, a compressor with externally controlled variable displacement located downstream of said evaporator, and an expansion valve located upstream of said evaporator; said control method comprising:

supplying a reference temperature ($T_{REF}$) indicating a temperature of air that is desired to reach downstream of the evaporator and an effective temperature ($T_{MIS}$) indicating a temperature of the air present downstream of said evaporator;

generating a control signal ($S_C$) for said compressor to bring said effective temperature ($T_{MIS}$) to be substantially equal to said reference temperature ($T_{REF}$);

generating, as a function of the control signal ($S_C$), a temperature disturbance ($\Delta T_{EVAP}$) indicating an estimate of an oscillatory effect generated by the expansion valve on the temperature of the air downstream of the evaporator when the compressor is driven by the control signal ($S_C$); and removing from said effective temperature ($T_{MIS}$) said temperature disturbance ($\Delta T_{EVAP}$) to eliminate the oscillatory effect on said effective temperature ($T_{MIS}$) of the air downstream of the evaporator.

9. A control method according to claim 8, wherein: said step of generating a temperature disturbance ($\Delta T_{EVAP}$) comprises estimating said temperature disturbance ($\Delta T_{EVAP}$) on the basis of a system model, and according to said control signal ($S_C$) of said compressor.

10. A control method according to claim 9, wherein: said step of estimating said temperature disturbance ($\Delta T_{EVAP}$) comprises converting the control signal ($S_C$) into an intake pressure ($P_{LOW}$) of the compressor; and determining said temperature disturbance ($\Delta T_{EVAP}$) as a result of a transfer function ($F(z)$) determined on the basis of a first effect produced by the expansion valve on the temperature of the air downstream of the evaporator when the compressor is controlled by the control signal ($S_C$) and on the basis of a second effect produced by the evaporator on the temperature of the air downstream of the evaporator itself when the compressor is controlled by the control signal ($S_C$).

11. A control device especially adapted for an air conditioning system of a motor vehicle having an evaporator, a compressor with an externally controlled variable displacement located downstream of the evaporator, and an expansion valve located upstream of the evaporator, the control device comprising;

(i) control means for receiving a reference temperature ($T_{REF}$) indicating a temperature of air that desired to be obtained downstream of the evaporator, and an effective temperature ($T_{MIS}$) indicating an actual temperature of the air present downstream of said evaporator, said control means providing a control signal ($S_C$) to said compressor to cause said effective temperature ($T_{MIS}$) to be substantially equal to said reference temperature ($T_{REF}$);

(ii) observer means for indicating an estimate of an oscillatory effect generated by the expansion valve on the temperature of the air downstream of the evaporator when the compressor is driven by the control signal ($S_C$), said observer means receiving the control signal ($S_C$), and supplying a temperature disturbance ($\Delta T_{EVAP}$) corresponding to the oscillatory effect; and (iii) first adder means for removing from said effective temperature ($T_{MIS}$) said temperature disturbance ($\Delta T_{EVAP}$) to therefore eliminate the oscillatory effect on said effective temperature ($T_{MIS}$) of the air downstream of the evaporator.

* * * * *